(12) United States Patent
Tanaka et al.

(10) Patent No.: US 8,080,319 B2
(45) Date of Patent: Dec. 20, 2011

(54) THERMOSETTING RESIN COMPOSITION AND USE THEREOF

(75) Inventors: Ryutaro Tanaka, Kita-ku (JP); Makoto Uchida, Kita-ku (JP); Hiroo Koyanagi, Kita-ku (JP)

(73) Assignee: Kippon Kayaku Kabushiki Kaisha, Tokyo (JP)

( * ) Notice: Subject to any disclaimer, the term of this patent is extended or adjusted under 35 U.S.C. 154(b) by 918 days.

(21) Appl. No.: 12/083,588

(22) PCT Filed: Oct. 18, 2006

(86) PCT No.: PCT/JP2006/320724
§ 371 (c)(1),
(2), (4) Date: Apr. 15, 2008

(87) PCT Pub. No.: WO2007/046405
PCT Pub. Date: Apr. 26, 2007

(65) Prior Publication Data
US 2009/0286087 A1    Nov. 19, 2009

(30) Foreign Application Priority Data
Oct. 21, 2005    (JP) ................. 2005-306517

(51) Int. Cl.
B32B 27/38    (2006.01)
C08G 69/26    (2006.01)
C08L 63/00    (2006.01)

(52) U.S. Cl. .............. 428/473.5; 428/413; 524/538; 525/429; 525/430

(58) Field of Classification Search ........... 428/473.5, 428/413; 524/538; 525/429, 430
See application file for complete search history.

(56) References Cited

U.S. PATENT DOCUMENTS

| | | | |
|---|---|---|---|
| 4,629,777 A | 12/1986 | Pfeifer | |
| 4,937,133 A | 6/1990 | Watanabe et al. | |
| 5,037,691 A | 8/1991 | Medney et al. | |
| 5,268,447 A | 12/1993 | Tamai et al. | |
| 5,677,393 A | 10/1997 | Ohmori et al. | 525/423 |
| 6,340,518 B1 | 1/2002 | Kitahara et al. | |
| 7,115,681 B2 | 10/2006 | Shimo-Ohsako et al. | 524/538 |
| 2003/0040578 A1 | 2/2003 | Sugo et al. | 525/100 |
| 2004/0019174 A1 | 1/2004 | Ichiroku et al. | 528/25 |
| 2006/0054589 A1 | 3/2006 | Omori et al. | |
| 2009/0286087 A1 | 11/2009 | Tanaka et al. | |

FOREIGN PATENT DOCUMENTS

| | | |
|---|---|---|
| JP | 2-180980 A | 7/1990 |
| JP | 4-345682 A | 12/1992 |
| JP | 4-366194 A | 12/1992 |
| JP | 5-22399 B2 | 3/1993 |
| JP | 10-733 | 1/1998 |
| JP | 10-81748 | 3/1998 |
| JP | 2000-183239 A | 6/2000 |
| JP | 3221756 | 8/2001 |
| JP | 2002-3715 | 1/2002 |
| JP | 2002-289196 | 10/2002 |
| JP | 2003-118054 | 4/2003 |
| JP | 2003-306649 A | 10/2003 |
| JP | 2004-35650 | 2/2004 |
| JP | 2004-51794 | 2/2004 |
| JP | 2004-91734 | 3/2004 |
| JP | 2005-82628 | 3/2005 |
| JP | 2005-290327 A | 10/2005 |
| JP | 2005-330401 | 12/2005 |
| JP | 2006-82228 A | 3/2006 |
| WO | 03/006553 | 1/2003 |
| WO | 2007/046405 A1 | 4/2007 |
| WO | 2007/148666 A1 | 12/2007 |

OTHER PUBLICATIONS

International Search Report dated Oct. 28, 2008 in co-pending foreign application (PCT/JP2008/002568).
International Search Report dated Oct. 2, 2007 in co-pending foreign application (PCT/JP2007/062266).
The International Search Report dated Dec. 26, 2006.
Chinese communication dated Jul. 30, 2010 in a co-pending foreign application (CN200780019440.x).
Office Action dated Jun. 23, 2011 in co-pending U.S. Appl. No. 12/308,308.

Primary Examiner — Timothy J. Kugel
(74) Attorney, Agent, or Firm — Nields, Lemack & Frame, LLC

(57) ABSTRACT

Disclosed is related to a thermosetting resin composition which comprises a polyimide resin (A) having a phenolic hydroxyl group, preferably a polyimide resin (A) produced from an aminophenol (a), a diamino compound (b) and a tetrabasic acid dianhydride (c), and an epoxy resin (B); and a cured product thereof. The resin composition is excellent in storage stability, and gives a cured product excellent in flame retardancy and heat resistance. Furthermore, when the cured product is in a film form, the product has sufficient flexibility and excellent folding endurance.

17 Claims, No Drawings

THERMOSETTING RESIN COMPOSITION AND USE THEREOF

TECHNICAL FIELD

The present invention relates to a thermosetting resin composition which gives a cured product excellent in flame retardancy and heat resistance without containing any halogen-containing flame retardant or antimony compound, the cured product having sufficient flexibility when the product is a film-form (or thin-film-form) cured product, and which has excellent storage stability.

BACKGROUND ART

When epoxy resins are cured with various curing agents, the resins are turned to cured products which are generally excellent in mechanical property, water resistance, chemical resistance, heat resistance, electric property and others; thus, the resins are used in wide fields of adhesives, paints, laminated plates, molding materials, casting materials and others. The epoxy resin which has been most popularly used hitherto is bisphenol A type epoxy resin. A cured product of the epoxy resin, itself, is insufficient in flame retardancy. Thus, in order to give flame retardancy thereto, a flame retardant or the like has been compounded into the epoxy resin hitherto. Usually, as the flame retardant, a bromine compound, an antimony compound of a flame retardant assistant, or the like is used; there are generally known tetrabromobisphenol A and epoxidized products thereof, a compound obtained by causing tetrabromobisphenol A to react with bisphenol A type epoxy resin, and others. As a curing agent for the epoxy resin, acid anhydrides or amine compounds are known; however, in electric and electronic fields, phenol novolac is used in many cases from the viewpoint of reliabilities such as heat resistance. In recent years, there has been known an example wherein an aromatic polyamide having a phenolic hydroxyl group is used as the curing agent in order to improve the heat resistance and the flexibility (Patent Document 1).

In the meantime, polyimide has excellent heat resistance, flame retardancy, flexibility, mechanical property, electrical property and chemical resistance, and is widely used in electric/electronic parts, semiconductors, communication equipment and circuit parts therein, and peripheral equipment therein. Polyimide resin is slightly soluble in organic solvents; therefore, it is necessary that a polyamic acid, which is a precursor thereof, is painted onto a substrate and next the resultant is heated and dehydrated. At this time, curling based on hardening shrinkage is caused and water is generated. These are problems. In recent years, solvent-soluble polyimide has been developed, and has been used for coating or as orienting films or insulating films (Patent Document 2).

Patent Document 1: JP 2005-29720 A
Patent Document 2: Republication Patent WO2003-060010

DISCLOSURE OF THE INVENTION

Problems to be Solved by the Invention

However, bromine-containing compounds as described above may generate materials which cause environmental pollution when the compounds are disposed of and are incinerated although the compounds are excellent in flame retardancy. This point is pointed out as a problem. About antimony compounds used as a flame retardant assistant also, the toxicity thereof gives a cause for anxiety.

A cured product of epoxy resin wherein phenol novolac is used as a curing agent is excellent in reliability; however, the cured product is rigid, and lacks flexibility. There is also an epoxy resin wherein an aromatic polyamide having a phenolic hydroxyl group is used as a curing agent in order to improve the heat resistance and the flexibility. Although the flexibility of this resin is greatly improved, the heat resistance is insufficient. Furthermore, the elastic modulus of a cured film therefrom is low, and the film property thereof is insufficient.

An object of the present invention is to provide a resin composition which gives a cured product having excellent flame retardancy, heat resistance, mechanical property, flexibility and other properties, the cured product being able to cope with an improvement in the function of various recent electronic instruments; and a cured product thereof.

Means for Solving the Problems

In order to solve the above-mentioned problems, the inventors have made eager researches to make the present invention.

Accordingly, the invention is:

(1) A thermosetting resin composition, which comprises a polyimide resin (A) having a phenolic hydroxyl group and an epoxy resin (B), wherein the content proportion of the polyimide resin (A) is such a proportion that the equivalent of active hydrogen in the polyimide resin (A) is from 0.7 to 1.2 equivalents per equivalent of epoxy groups in the epoxy resin (B).

(2) The thermosetting resin composition according to item (1), wherein the polyimide resin (A) having a phenolic hydroxyl group is produced from a diamine component having a phenolic hydroxyl group (hereinafter referred to as an aminophenol (a)), a diamine component having no phenolic hydroxyl group (hereinafter referred to as a diamino compound (b)), and a tetrabasic acid dianhydride (c).

(3) The thermosetting resin composition according to item (2), wherein the aminophenol (a) is one or more selected from the group consisting of 3,3'-diamino-4,4'-dihydroxydiphenylsulfone, 3,3'-diamino-4,4'-dihydroxydiphenyl ether, 3,3'-diamino-4,4'-dihydroxybiphenyl, 3,3'-dihydroxy-4,4'-diaminobiphenyl, 2,2-bis(3-amino-4-hydroxyphenyl)propane, 1,3-hexafluoro-2,2-bis(3-amino-4-hydroxyphenyl)propane, and 9,9'-bis(3-amino-4-hydroxyphenyl)fluorene.

(4) The thermosetting resin composition according to item (1) or (2), wherein the polyimide resin (A) is a resin having, in the skeleton thereof, a sulfonyl group.

(5) The thermosetting resin composition according to any one of items (1) to (4), wherein the epoxy resin (B) is one or more selected from the group consisting of novolac type epoxy resin, xylylene-skeleton-containing phenol novolac type epoxy resin, biphenyl-skeleton-containing novolac type epoxy resin, bisphenol A type epoxy resin, bisphenol F type epoxy resin, tetramethylbiphenol type epoxy resin, triphenylmethane type epoxy resin, and glyoxal type epoxy resin.

(6) The thermosetting resin composition according to any one of items (1) to (5), which comprises a curing promoting agent.

(7) A varnish which comprises the thermosetting resin composition according to any one of items (1) to (6), and a solvent.

(8) A sheet which has a layer comprising the composition according to any one of items (1) to (6) on both surfaces or one surface of a planar support.

(9) The sheet according to item (8), wherein the planar support is a polyimide film, a metal foil or a peeling film.

(10) A prepreg which is obtained by impregnating a substrate with the varnish according to item (7), and drying the resultant.

(11) A cured product wherein the thermosetting resin composition according to any one of items (1) to (6) is cured.

(12) A thermosetting resin composition which comprises a polyimide resin (A) having a phenolic hydroxyl group and an epoxy resin (B), wherein the polyimide resin (A) having a phenolic hydroxyl group is produced from an aminophenol (a), a diamino compound (b) and a tetrabasic acid dianhydride (c), and the diamino compound (b) is one or more selected from m-phenylenediamine, p-phenylenediamine, m-tolylenediamine, 4,4'-diaminodiphenyl ether, 3,3'-dimethyl-4,4'-diaminodiphenyl ether, 3,4'-diaminodiphenyl ether, 4,4'-diaminodiphenyl thioether, 3,3'-dimethyl-4,4'-diaminodiphenyl thioether, 3,3'-diethoxy-4,4'-diaminodiphenyl thioether, 3,3'-diaminodiphenyl thioether, 4,4'-diaminobenzophenone, 3,3'-dimethyl-4,4'-diaminobenzophenone, 3,3'-diaminodiphenylmethane, 4,4'-diaminodiphenylmethane, 3,4'-diaminodiphenylmethane, 3,3'-dimethoxy-4,4'-diaminodiphenyl thioether, 2,2'-bis(3-aminophenyl)propane, 2,2'-bis(4-aminophenyl)propane, 4,4'-diaminodiphenylsulfoxide, 3,3'-diaminodiphenylsulfone, 4,4'-diaminodiphenylsulfone, benzidine, 3,3'-dimethylbenzidine, 3,3'-dimethoxybenzidine, 3,3'-diaminobiphenyl, p-xylylenediamine, m-xylylenediamine, o-xylylenediamine, 2,2'-bis(3-aminophenoxyphenyl)propane, 2,2'-bis(4-aminophenoxyphenyl)propane, 1,3-bis(4-aminophenoxyphenyl)benzene, 1,3'-bis(3-aminophenoxyphenyl)propane, bis(4-amino-3-methylphenyl)methane, bis(4-amino-3,5-dimethylphenyl)methane, bis(4-amino-3-ethylphenyl)methane, bis(4-amino-3,5-diethylphenyl)methane, bis(4-amino-3-propylphenyl)methane, bis(4-amino-3,5-dipropylphenyl)methane, siliconediamine, isophoronediamine, hexamethylenediamine, or trimethylhexamethylenediamine.

(13) The thermosetting resin composition according to item (3), wherein the epoxy resin (B) is comprised in an amount of 30 to 100 parts by weight for 100 parts by weight of the polyimide resin (A).

(14) The thermosetting resin composition according to item (2), which comprises a polyimide resin (A) having a phenolic hydroxyl group and an epoxy resin (B), wherein the polyimide resin (A) having a phenolic hydroxyl group is produced from an aminophenol (a), a diamino compound (b) and a tetrabasic acid dianhydride (c), the aminophenol (a) is a diaminodihydroxydiphenyl compound wherein two phenyl groups each substituted with both of an amino group and a hydroxyl group are bonded to each other through —$SO_2$—, —O—, or -($CH_3$ which may be substituted with fluorine)C($CH_3$ which may be substituted with fluorine)-, and the diamino compound (b) is a diaminodiphenyl compound wherein two amino-substituted phenyl groups in which each of the benzene rings may be substituted with a C1-C4 alkyl group or a C1-C4 alkoxy group are bonded directly to each other, or bonded to each other through a crosslinking group.

(15) The thermosetting resin composition according to item (1), wherein the polyimide resin (A) having a phenolic hydroxyl group is a resin obtained by polycondensing 3,3',4,4'-diphenylsulfonetetracarboxylic acid dianhydride with 3,3'-diamino-4,4'-dihydroxydiphenyl ether and 4,4'-diaminodiphenyl ether, or by polycondensing 3,3',4,4'-biphenyltetracarboxylic acid dianhydride with 3,3'-diamino-4,4'-dihydroxydiphenylsulfone and isophoronediamine.

(16) The thermosetting resin composition according to item (14), wherein the crosslinking group of the diamino compound (b) is —O—, —O—$C_6H_4$—O—, —$SO_2$—, or a C1-C10 alkylene which may be branched.

(17) The thermosetting resin composition according to item (14), wherein the diamino compound (b) is at least one selected from the group consisting of 4,4'-diaminodiphenyl ether, 1,3-bis(3-aminophenoxy)benzene, and isophoronediamine.

Effect Of The Invention

The cured product of the thermosetting resin composition of the invention is excellent in flame retardancy, heat resistance, mechanical property and flexibility. Moreover, the resin composition, in particular, the varnish is excellent in storage stability, so as to be useful for various articles such as molding materials, casting materials, laminating materials, paints, and coverlays.

BEST MODE FOR CARRYING OUT THE INVENTION

The thermosetting resin composition of the invention comprises a polyimide resin (A) having a phenolic hydroxyl group and an epoxy resin (B). The polyimide resin (A) having a phenolic hydroxyl group, which may be referred to merely as the polyimide resin (A) hereinafter, is not particularly limited as long as it is a polyimide resin having a phenolic hydroxyl group. Polyimide resin is usually obtained by polycondensing a diamine component with a tetrabasic acid dianhydride. When a compound having a phenolic hydroxyl group is used as at least one of the diamine component and the tetrabasic acid dianhydride, the polyimide resin (A) can be obtained. When at least one of the diamine component and the tetrabasic acid dianhydride is a compound having a sulfonyl group, a preferred polyimide resin (A) can be obtained.

In the invention, preferred is the polyimide resin (A) obtained by using a compound having a phenolic hydroxyl group as the diamine component. In the invention, particularly preferred is a resin obtained by using a combination of this diamine component having a phenolic hydroxyl group, which may be referred as the aminophenol (a) hereinafter, with a diamine component having no phenolic hydroxyl group, which may be referred to as the diamino compound (b) for convenience hereinafter (the diamino compound (b) referred to herein means a diamino component other than the component (a)), and condensing these diamine components with a tetrabasic acid dianhydride (c).

The hydroxyl group equivalent of the aminophenol (a) used to produce the polyimide resin (A) having a phenolic hydroxyl group in the invention is preferably from 110 to 900 g/equivalent, more preferably from 120 to 500 g/equivalent. Any compound having a hydroxyl group equivalent less than 110 is not easily obtained. If the hydroxyl group equivalent is more than 900, the introduction ratio of hydroxyl groups becomes low so that the crosslinkage density falls. Thus, various properties may deteriorate.

The aminophenol (a) is not particularly limited as long as it is a compound having, in a single molecule thereof, at least two amino groups and at least one phenolic hydroxyl group. Examples of the aminophenol (a) which can be used include 3,3'-diamino-4,4'-dihydroxydiphenylsulfone, 3,3'-diamino-4,4'-dihydroxydiphenyl ether, 3,3'-diamino-4,4'-dihydroxybiphenyl, 3,3'-dihydroxy-4,4'-diaminobiphenyl, 2,2-bis(3-amino-4-hydroxyphenyl)propane, 1,3-hexafluoro-2,2-bis(3-amino-4-hydroxyphenyl)propane, and 9,9'-bis(3-amino-4-hydroxyphenyl)fluorene. However, the aminophenol (a) is not limited thereto. These may be used alone or in the form of a mixture composed of two or more thereof.

Preferred examples thereof are diaminodihydroxydiphenyl compounds wherein two phenyl groups each substituted with both of an amino group and a hydroxyl group are bonded to each other through a crosslinking group such as —SO$_2$—, —O— or —(CH$_3$ which may be substituted with fluorine) C(CH$_3$ which may be substituted with fluorine)-, examples of the compounds including 3,3'-diamino-4,4'-dihydroxydiphenylsulfone, 3,3'-diamino-4,4'-dihydroxydiphenyl ether, and 2,2-bis(3-amino-4-hydroxyphenyl)propane. More preferred examples thereof are diaminodihydroxydiphenyl compounds wherein two phenyl groups each substituted with both of an amino group and a hydroxyl group are bonded to each other through —SO$_2$— or —O— (diaminodihydroxydiphenylsulfone or diaminodihydroxydiphenyl ether), examples of the compounds including 3,3'-diamino-4,4'-dihydroxydiphenylsulfone, and 3,3'-diamino-4,4'-dihydroxydiphenyl ether. About the substitution positions of the amino group and the hydroxy group on each of the phenyl groups in these compounds, it is preferred that one of the positions is the 3-position and the other is the 4-position. More preferred is a compound wherein amino groups are each substituted at the 3-position and hydroxy groups are each substituted at the 4-position (3,3'-diamino-4,4'-dihydroxydiphenylsulfone, or 3,3'-diamino-4,4'-dihydroxydiphenyl ether).

The diamino compound (b) is not particularly limited as long as the compound is a compound which is different from the aminophenol (a) and has, in a single molecule thereof, two amino groups.

Examples thereof include phenylenediamine which may be substituted with a C1-C4 alkyl group; diaminodiphenyl compounds wherein two amino-substituted phenyl groups (wherein each of the benzene rings may be further substituted with a C1-C4 alkyl group or a C1-C4 alkoxy group) are bonded directly to each other or are bonded to each other through a crosslinking group (such as —O—, —O—C$_6$H$_4$—O—, —S—, —SO$_2$—, —CO$_2$— or a C1-C10 alkylene which may be branched); and C1-C10 aliphatic diamines. A silicone diamine or the like may be used in some cases.

A preferred example thereof is a diaminodiphenyl compound wherein the phenyl groups are bonded to each other through the above-mentioned crosslinking group, or isophoronediamine. A preferred example of the crosslinking group in the diaminodiphenyl compound is —O—, —O—C$_6$H$_4$—O—, —SO$_2$—, or a C1-C10 alkylene which may be branched, and a more preferred example thereof is —O—, —O—C$_6$H$_4$—O—, or —SO$_2$—.

Preferred specific examples of the diamino compound (b) include m-phenylenediamine, p-phenylenediamine, m-tolylenediamine, 4,4'-diaminodiphenyl ether, 3,3'-dimethyl-4,4'-diaminodiphenyl ether, 3,4'-diaminodiphenyl ether, 4,4'-diaminodiphenyl thioether, 3,3'-dimethyl-4,4'-diaminodiphenyl thioether, 3,3'-diethoxy-4,4'-diaminodiphenyl thioether, 3,3'-diaminodiphenyl thioether, 4,4'-diaminobenzophenone, 3,3'-dimethyl-4,4'-diaminobenzophenone, 3,3'-diaminodiphenylmethane, 4,4'-diaminodiphenylmethane, 3,4'-diaminodiphenylmethane, 3,3'-dimethoxy-4,4'-diaminodiphenyl thioether, 2,2'-bis(3-aminophenyl)propane, 2,2'-bis(4-aminophenyl)propane, 4,4'-diaminodiphenylsulfoxide, 3,3'-diaminodiphenylsulfone, 4,4'-diaminodiphenylsulfone, benzidine, 3,3'-dimethylbenzidine, 3,3'-dimethoxybenzidine, 3,3'-diaminobiphenyl, p-xylylenediamine, m-xylylenediamine, o-xylylenediamine, 2,2'-bis(3-aminophenoxyphenyl)propane, 2,2'-bis(4-aminophenoxyphenyl)propane, 1,3-bis(4-aminophenoxyphenyl)benzene, 1,3-bis(3-aminophenoxy) benzene, 1,3'-bis(3-aminophenoxyphenyl)propane, bis(4-amino-3-methylphenyl)methane, bis(4-amino-3,5-dimethylphenyl)methane, bis(4-amino-3-ethylphenyl)methane, bis(4-amino-3,5-diethylphenyl)methane, bis(4-amino-3-propylphenyl)methane, bis(4-amino-3,5-dipropylphenyl)methane, isophoronediamine, hexamethylenediamine, and trimethylhexamethylenediamine. In some cases, a siliconediamine or the like may be used. These may be used alone or in the form of a mixture composed of two or more thereof. Out of these, more preferred is diaminodiphenyl ether, isophoronediamine, or bisaminophenoxybenzene.

As the tetrabasic acid dianhydride (c), any compound that has in the molecule thereof at least two acid anhydride structures may be used. Examples thereof include pyromellitic anhydride, ethylene glycol-bis(anhydrotrimellitate), glycerin-bis(anhydrotrimellitate)monoacetate, 1,2,3,4-butanetetracarboxylic acid dianhydride, 3,3',4,4'-diphenylsulfonetetracarboxylic acid dianhydride, 3,3',4,4'-benzophenonetetracarboxylic acid dianhydride, 3,3',4,4'-biphenyltetracarboxylic acid dianhydride, 3,3',4,4'-diphenyl ether tetracarboxylic acid dianhydride, 2,2-bis(3,4-anhydrodicarboxyphenyl)propane, 2,2-bis(3,4-anhydrodicarboxyphenyl)hexafluoropropane, bicyclo[2.2.2]oct-7-ene-2,3,5,6-tetracarboxylic acid dianhydride, bicycle[2.2.2]octane-2,3,5,6-tetracarboxylic acid dianhydride, 5-(2,5-dioxotetrahydro-3-furanyl)-3-methylcyclohexene-1,2-d icarboxylic acid anhydride, and 3a,4,5,9b-tetrahydro-5-(tetrahydro-2,5-dioxo-3-furanyl)-naphtho[1,2-c]furane-1,3-dione. Preferred are tetracarboxylic acid dianhydrides wherein two benzene rings each have one acid anhydride group and the benzene rings are bonded directly to each other or bonded through —O—, —SO$_2$— or —CO— to each other. More preferred is a compound selected from 3,3',4,4'-diphenylsulfonetetracarboxylic acid dianhydride, 3,3',4,4'-benzophenonetetracarboxylic acid dianhydride, 3,3',4,4'-biphenyltetracarboxylic acid dianhydride, and 3,3',4,4'-diphenyl ether tetracarboxylic acid dianhydride.

Particularly preferred is 3,3',4,4'-diphenylsulfonetetracarboxylic acid dianhydride, 3,3',4,4'-biphenyltetracarboxylic acid dianhydride, or 3,3',4,4'-diphenyl ether tetracarboxylic acid dianhydride.

The polyimide resin (A) can be obtained by a usual method. According to, for example, a method described in Patent Document 2, the polyimide resin (A) can be produced by polycondensing a tetrabasic acid dianhydride with the aminophenol (a) and the diamino compound (b), both of which may be referred to as diamine components hereinafter, preferably in the presence of a lactone such as γ-valerolactone, and a base (such as pyridine or N-methylmorpholine) as catalysts. The use ratio between the tetrabasic acid dianhydride and the diamine components is as follows: the diamine components/the tetrabasic acid dianhydride=0.5 to 2 (by mole ratio), preferably the diamine components/the tetrabasic acid dianhydride=0.8 to 1.5 (by mole ratio). As the case may be, it is preferred that the tetrabasic acid dianhydride is used in a slightly excessive amount over the amount of the diamine components.

The ratio of the aminophenol (a) in the diamine components (the component (a) and the component (b)) is from 1 to 95% by mole, preferably from 1 to 70% by mole, more preferably from 3 to 60% by mole, and the ratio of the diamino compound (b) of the balance is from 5 to 99% by mole, preferably from 30 to 99% by mole, more preferably from 40 to 97% by mole. As the case may be, the ratio of the aminophenol (a) may be from 50 to 95%, more preferably more than 50% by mole and 92% or less by mole. The ratio of the diamino compound (b) of the balance is from 5 to 50% by mole, more preferably 8% or more by mole and less than 50% by mole.

In the synthesis of the polyimide resin (A), in case that the above-mentioned polycondensation is conducted in the presence of catalysts (such as the above-mentioned lactone and base), a linear aromatic polyimide copolymer (the polyimide resin (A)) can be easily produced without protecting the phenolic hydroxyl groups, which are functional groups. This would be because when the condensing reaction is conducted in the presence of the catalysts, the condensing reaction proceeds without causing the phenolic hydroxyl groups to react with other reactive groups, for example, an acid anhydride or amino group.

The lactone used for the catalysts is preferably γ-valerolactone, and the base is preferably pyridine and/or M-methylmorpholine.

Examples of the solvent used when the polyimide resin (A) is synthesized include methyl ethyl ketone, methyl propyl ketone, methyl isopropyl ketone, methyl butyl ketone, methyl isobutyl ketone, methyl n-hexyl ketone, diethyl ketone, diisopropyl ketone, diisobutyl ketone, cyclopentanone, cyclohexanone, methylcyclohexanone, acetylacetone, γ-butyrolactone, diacetone alcohol, cyclohexane-1-one, dipropyl ether, diisopropyl ether, dibutyl ether, tetrahydrofuran, tetrahydropyrane, ethyl isoamyl ether, ethyl-t-butyl ether, ethyl benzyl ether, cresyl methyl ether, anisole, phenetole, methyl acetate, ethyl acetate, propyl acetate, isopropyl acetate, butyl acetate, isobutyl acetate, amyl acetate, isoamyl acetate, 2-ethylhexyl acetate, cyclohexyl acetate, methylcyclohexyl acetate, benzyl acetate, methyl acetoacetate, ethyl acetoacetate, methyl propionate, ethyl propionate, butyl propionate, benzyl propionate, methyl butyrate, ethyl butyrate, isopropyl butyrate, butyl butyrate, isoamyl butyrate, methyl lactate, ethyl lactate, butyl lactate, ethyl isovalerate, isoamyl isovalerate, diethyl oxalate, dibutyl oxalate, methyl benzoate, ethyl benzoate, propyl benzoate, methyl salicylate, N-methylpyrrolidone, N,N-dimethylformamide, N,N-dimethylacetoamide, and dimethylsulfoxide. However, the solvent is not limited thereto. These may be used alone or in the form of a mixture composed of two or more thereof. Out of these, preferred are ketone solvents such as γ-butyrolactone, and more preferred are cyclic ketones having a 4-membered or 5-membered ring.

The process for producing the polyimide resin (A) will be more specifically described hereinafter.

In an inert atmosphere such as nitrogen, the diamine components and the tetrabasic acid dianhydride are added, at the above-mentioned ratio, to a mixed solvent composed of the above-mentioned catalysts and solvent(s). Next, the resultant is heated and stirred while water generated by the reaction (water generated accompanied with the formation of an imide ring) is distilled off. In this way, the components are caused to react sufficiently, thereby yielding a polyimide resin (A) solution. At this time, toluene or the like as a dehydrating agent may be mixed therewith. Usually, the reaction temperature is preferably from 120 to 230° C. The reaction time is largely affected by the reaction temperature; in any case the reaction system is preferably stirred until the highest viscosity, which means the highest polymerization degree, is obtained. Usually, the time is from several minutes to 20 hours. It is also allowable to pour the resultant solution into a poor solvent such as methanol and hexane to separate the produced polymer, and purify the polymer by re-precipitation to remove byproducts, whereby a purified polyimide resin (A) can be yielded.

The active hydrogen equivalent of the polyimide resin (A) yielded as described above is approximately from 200 to 1500 g/eq, more preferably approximately from 200 to 600 g/eq, in particular preferably approximately from 250 to 550 g/eq. The weight-average molecular weight thereof, which is a molecular weight converted to that of polystyrene by gel permeation chromatography (the same matter will be applied to any weight-average molecular weight in the following description), is preferably more than 50000. For example, the molecular weight is preferably from about 51000 to 150000, more preferably from about 56000 to 150000. The molecular weight is from about 56000 to 100000 as the case may be.

The thermosetting resin composition of the invention contains an epoxy resin (B) as a component other than the polyimide resin (A).

The epoxy resin used as the epoxy resin (B) is not particularly limited as long as the resin is a resin having in a single molecule thereof two or more epoxy groups. Preferred is an epoxy resin having an aromatic ring such as a benzene ring, a biphenyl ring or a naphthalene ring from the viewpoint of mechanical strength, flame retardancy and others. Specific examples thereof include novolac type epoxy resin, xylylene-skeleton-containing phenol novolac type epoxy resin, biphenyl-skeleton-containing novolac type epoxy resin, bisphenol A type epoxy resin, bisphenol F type epoxy resin, tetramethylbiphenol type epoxy resin, triphenylmethane type epoxy resin, and glyoxal type epoxy resin. However, the epoxy resin is not limited thereto. Glyoxal type epoxy resin is one out of more preferred examples thereof.

As a curing agent in the thermosetting resin composition of the invention, a curing agent other than the polyimide resin (A) having a phenolic hydroxyl group may be together used. Specific examples of the curing agent which may be together use include diaminodiphenylmethane, diethylenetriamine, triethylenetetramine, diaminodiphenylsulfone, isophoronediamine, dicyandiamide, polyamide resin synthesized from a dimer of linolenic acid and ethylenediamine, phthalic anhydride, trimellitic anhydride, pyromellitic anhydride, maleic anhydride, tetrahydrophthalic anhydride, methyltetrahydrophthalic anhydride, methylnadic anhydride, hexahydrophthalic anhydride, methylhexahydrophthalic anhydride, phenol novolac, triphenylmethane, modified products of these compounds, imidazole, $BF_3$-amine complexes, and guanidine derivatives. However, the curing agent is not limited thereto. When one or more of these compounds are together used, the ratio of the polyimide resin (A) in all of the curing agents is usually 20% or more by weight (in the following description, the symbol "%" means % by weight unless otherwise specified), preferably 30% or more, more preferably 50%. More preferably, the ratio of the polyimide resin (A) is more than 50% and less than 100%. Usually, it is preferred to use the polyimide resin (A) alone.

The used amount of the curing agent(s) in the thermosetting resin composition of the invention is preferably from 0.7 to 1.2 active hydrogen equivalents per equivalent of epoxy groups of the epoxy resin. If the used amount is less than 0.7 active hydrogen equivalent per equivalent of the epoxy groups or is more than 1.2 active hydrogen equivalents, the curing becomes insufficient so that a good curing physical property may not be obtained. The active hydrogen equivalent of the polyimide resin (A) having a phenolic hydroxyl group can be calculated, from the ratio between the diamine components and the tetrabasic acid dianhydride that are charged at the time of the reaction, as follows:

{the total charged weight of the diamine components (the component (a) and the component (b)), and the tetrabasic acid dianhydride–the weight of water generated when the components are converted to an imide}/(the mole number of OH groups in the aminophenol (a)).

The ratio by weight between the polyimide resin (A) and the epoxy resin in the thermosetting resin composition of the invention is varied in accordance with the active hydrogen equivalent or the epoxy equivalent of each of the used compounds; thus, the ratio is not specified without reservation. In general, for 100 parts by weight of the polyimide resin (A) (hereinafter, the word "part(s)" represents part(s) by weight unless otherwise specified), the amount of the epoxy resin is from 1 to 100 parts, preferably from 25 to 100 parts, more preferably from 30 to 100 parts, most preferably from 50 to 100 parts.

The thermosetting resin composition of the invention may further contain a curing promoter if necessary. It is usually preferred that the composition contains the curing promoter. Specific examples of the curing promoter include imidazoles such as 2-methylimidazole, 2-ethylimidazole, 2-ethyl-4-methylimidazole, 2-phenyl-4,5-dihydroxymethylimidazole, and 2-phenyl-4-methyl-5-hydroxymethyl imidazole; tertiary amines such as 2-(dimethylaminomethyl)phenol, and 1,8-diaza-bicyclo(5,4,0)undecene-7; phosphines such as triphenylphosphine; and metal compounds such as tin octylate. Usually, imidazoles are preferred. As the need arises, the curing promoter is used in an amount of 0.1 to 5.0 parts for 100 parts of the epoxy resin (B).

The thermosetting resin composition of the invention may contain an inorganic filler if necessary. Specific examples of the inorganic filler include silica, alumina, and talc. The inorganic filler is used in an amount of 0 to 90% by weight of the epoxy resin composition of the invention. Furthermore, the thermosetting resin composition of the invention may contain various blending agents other than the curing promoter and the inorganic filler if necessary, examples of the agents including a silane coupling agent, releasing agents such as stearic acid, palmitic acid, zinc stearate and calcium stearate, and pigments.

The thermosetting resin composition of the invention is obtained by mixing the above-mentioned individual components evenly. The thermosetting resin composition of the invention can be easily turned to a cured product thereof by the same method as usually known in the art. For example, the epoxy resin and the curing agent, and the optional curing promoter, inorganic filler and other blending agent(s) are sufficiently mixed into an even state, optionally using an extruder, a kneader, a roller or the like, thereby yielding the thermosetting resin composition of the invention. The resultant epoxy resin composition is molded by melt casting, transfer molding, injection molding, compression molding or the like. The resultant is further heated at 80 to 200° C. for 2 to 10 hours, whereby the cured product of the invention can be yielded.

The varnish of the invention is a thermosetting resin composition comprising a solvent, and is one out of thermosetting resin compositions of the invention. The varnish of the invention can be obtained, for example, by blending the epoxy resin (B) and optional other components into a reaction solution containing the polyimide resin (A) obtained when the polyimide resin (A) is synthesized (a polyimide resin (A) solution) without isolating the resin (A) from this reaction solution. This method is simple so as to be most preferred. The varnish can also be obtained by using the isolated polyimide resin (A) and blending, into this resin, a solvent, the epoxy resin (B) and optional other components appropriately in any order. For example, it is allowable to prepare the thermosetting resin composition containing no solvent as described above, and then pour a solvent separately into the composition, thereby producing the varnish. If necessary, by use of the resin (A) purified by re-precipitation or the like, the varnish can be prepared. The solid concentration in the varnish, which is the concentration of components other than any solvent therein (the same matter will be applied to any solid concentration in the following description), is usually from 3 to 80% of the whole of the varnish, preferably from 5 to 50% thereof, and the balance is the solvent. As the case may be, the solid concentration is from 20 to 85%, more preferably from 30 to 85%, more preferably from 30 to 60%. The content by percentage of the polyimide resin (A) in the varnish is approximately from 2 to 45%, usually from 5 to 40%, preferably from 10 to 40%, more preferably from 15 to 35% of the whole of the varnish. The content is most preferably from 20 to 30% thereof. The content by percentage of the epoxy resin (B) is approximately from 1 to 35%, usually from 5 to 30%, preferably from 10 to 30%, more preferably from 10 to 25% of the whole of the varnish. The balance is made of any optional component and the solvent. The optional component may be contained in an amount of 0 to 60% of the whole of the varnish; the amount of the solvent is preferably 30% or more of the whole of the varnish, and is more preferably 40% or more and 75% or less thereof. The varnish is prepared so that amounts of the individual components are within the above-mentioned ranges, and the total amount of the individual components is 100%.

The sheet of the invention is obtained by painting, onto a planar support, the above-mentioned varnish in one out of various panting manners such as a gravure coating manner, a screen printing manner, a metal masking manner and a spin coating manner, which are themselves known, and then drying the resultant so as to make the thickness after the drying into a predetermined thickness, for example, a thickness of 5 to 100 μm, preferably 10 to 100 μm. If necessary, the painted layer may be heated and cured. The painting manner which should be used is appropriately selected in accordance with the kind of the base material, the shape and the size of the planar support, the film thickness of the painted film, or other factors. The base material is a polymer selected from various polymers such as polyamide, polyimide, polyarylate, polyethylene terephthalate (PET), polybutylene terephthalate, polyetheretherketone, polyetherimide, polyetherketone, polyketone, polyethylene and polypropylene, and/or copolymers thereof. The planar support may be a film made from the base material, a metal foil such as a copper foil, or the like. A polyimide film or a metal foil is preferred. From the resin composition of the invention in the sheet obtained by the above-mentioned painting and drying, a sheet-form cured product can be obtained by heating and curing the painted film. When the support is used particularly as a peeling sheet, the sheet can be used as a bonding sheet. Preferred examples of an article for which the sheet of the invention is used include flexible printed wiring board materials such as a flexible printed wiring board, a coverlay material, a bonding sheet, and a reinforced board.

Moreover, a cured product can be obtained by impregnating a base material, such as glass fiber, carbon fiber, polyester fiber, alumina fiber or paper, with the varnish of the invention, heating and drying the resultant to yield a prepreg, and then subjecting the prepreg to hot press molding. When the varnish is used in such an impregnation, the solid concentration in the varnish is preferably from 30 to 90%, more preferably from 30 to 85%.

EXAMPLES

The invention will be more specifically described by way of the following examples; however, the invention is not limited to the examples.

Synthesis Example 1

A 3-L flask equipped with a stirrer, a reflux condenser, a water trap, and a thermometer was purged with nitrogen, and the following were charged into the flask: 1364.3 g of γ-butyrolactone (solvent), 365.4 g (1.02 moles) of DSDA (3,3',4,4'-diphenylsulfonetetracarboxylic acid dianhydride, manufactured by New Japan Chemical Co., Ltd.; molecular weight: 358.28), 139.3 g (0.60 mole) of ADPE (3,3'-diamino-4,4'-dihydroxydiphenyl ether, manufactured by Nippon Kayaku Co., Ltd.; molecular weight: 232.24), 80.0 g (0.40 mole) of DADE (4,4'-diaminodiphenyl ether, manufactured by Wakayama Seika Kogyo Co., Ltd.; molecular weight: 200.00), 10.0 g of γ-valerolactone and 15.8 g of pyridine as catalysts; and 20 g of toluene as a dehydrating agent. The resultant solution was stirred at 180° C. for 8 hours while water was removed. This process gave a resin solution containing 30% of a polyimide resin having phenolic hydroxyl groups (this solution will be referred to as A-1).

The active hydrogen equivalent of the polyimide resin was 457.40 g/eq., and the weight-average molecular weight thereof was 78000. Both terminals thereof were acid anhydride groups.

Synthesis Example 2

A 3-L flask equipped with a stirrer, a reflux condenser, a water trap, and a thermometer was purged with nitrogen, and the following were charged into the flask: 1349.3 g of γ-butyrolactone (solvent), 308.96 g (1.05 moles) of BPDA (3,3',4,4'-biphenyltetracarboxylic acid dianhydride, manufactured by Ube Industries, Ltd.; molecular weight: 294.25), 252.3 g (0.90 mole) of ABPS (3,3'-diamino-4,4'-dihydroxydiphenylsulfone, manufactured by Nippon Kayaku Co., Ltd.; molecular weight: 280.3), 17.0 g (0.10 mole) of isophoronediamine (manufactured by Degussa-Huels AG; molecular weight: 170.25), 10.0 g of γ-valerolactone and 15.8 g of pyridine as catalysts; and 20 g of toluene as a dehydrating agent. The resultant solution was stirred at 180° C. for 8 hours while water was removed. This process gave a resin solution containing 30% of a polyimide resin having phenolic hydroxyl groups (this solution will be referred to as A-2).

The active hydrogen equivalent of the polyimide resin was 301.22 g/eq., and the weight-average molecular weight thereof was 61000. Both terminals thereof were acid anhydride groups.

Synthesis Example 3

A 3-L flask equipped with a stirrer, a reflux condenser, a water trap, and a thermometer was purged with nitrogen, and the following were charged into the flask: 1400.77 g of γ-butyrolactone (solvent), 316.42 g (1.02 moles) of ODPA (3,3',4,4'-diphenyl ether tetracarboxylic acid dianhydride, manufactured by Manac Inc.; molecular weight: 310.22), 196.21 g (0.70 mole) of ABPS, 87.70 (0.10 mole) of APB-N (1,3-bis(3-aminophenoxy)benzene, manufactured by Mitsui Chemicals, Inc.), 10.21 g of γ-valerolactone and 16.14 g of pyridine as catalysts; and 20 g of toluene as a dehydrating agent. The resultant solution was stirred at 180° C. for 8 hours while water was removed. This process gave a resin solution containing 30% of a polyimide resin having phenolic hydroxyl groups (this solution will be referred to as A-3).

The active hydrogen equivalent of the polyimide resin was 403.09 g/eq., and the weight-average molecular weight thereof was 90900. Both terminals thereof were acid anhydride groups.

Examples 1 and 2, and Comparative Example 1

There were used an NC-3000H manufactured by Nippon Kayaku Co., Ltd. (a biphenyl-phenol condensed epoxy resin; epoxy equivalent: 290 g/eq; softening point: 70° C.); the solution (A-1) and the solution (A-2) obtained in Synthesis Examples 1 and 2, respectively, and a GPH-78 manufactured by Nippon Kayaku Co., Ltd. (a phenol-glyoxazal condensed resin; hydroxyl group equivalent: 230 g/eq; softening point: 78° C.) as curing agents, and 2-phenyl-4,5-dihydroxymethylimidazole (2PHZ) as a curing promoter. The components were mixed in blending proportions shown in Table 1 (unit: "part(s)") to yield thermosetting resin compositions of the invention.

About the epoxy resins used in Examples 1 and 2, the epoxy equivalent of each of the resins was 0.345 equivalent. About the polyimide resins used therein, the active hydrogen equivalents thereof were 0.367 equivalent and 0.368 equivalent, respectively.

TABLE 1

| Varnish | Example 1 (1) | Example 2 (2) | Comparative Example 1 (3) |
|---|---|---|---|
| NC3000H | 100 | 100 | 100 |
| A-1 | 560 | | |
| A-2 | | 369.3 | |
| GPH-78 | | | 79.3 |
| 2 PHZ | 2 | 2 | 2 |
| γ-Butyrolactone | | | 185.0 |

The varnishes (1), (2) and (3) were stored at 60° C. to check the number of days required up to the gelatinization thereof. As a result, the varnishes (1) and (2) were not gelatinized over one week while the varnish (3) was gelatinized in two days.

Example 3

The varnishes (1), (2) and (3) were each painted onto a PET film (polyester film) to have a thickness of 50 μm after dried. The resultants were heated and cured at 180° C. for 1 hour, and then the PET films thereof were removed to yield sheet-form samples (films (1), (2) and (3)).

Even if the films (1) and (2) were each folded, the films were not each cracked. Thus, the films were films having sufficient flexibility. On the other hand, once the film (3) was folded, the film was fractured. Each of the resultants was cut into a width of 1 cm, and the cut sample was subjected to a folding test at a load of 500 g and a folding angle of 135° with an MIT tester (MIT tester described in the item "Folding Endurance" in JIS P8115). As a result, the samples (1) and (2) were folded 300 times or more, but were not fractured. However, when the sample (3) was once folded, it was fractured.

It can be understood from the above that the varnish of the invention has a capability of forming a film having a sufficient flexibility.

Next, the samples obtained in Example 3 were subjected to a flame retardant test in accordance with UL94-VTM (one out of safety standards set by Underwriters Laboratories Inc. in USA). As a result, the sheets (1) and (2) were evaluated as V-0; however, the sheet (3) was burned up in an instant. The flame retardancy evaluation V-0 was an evaluation of "flame retardancy" in the test.

Example 4

In Example 1, a thermosetting resin composition of the invention was yielded in the same manner as in Example 1 except that 560 parts of the solution (A-1) were changed to 494.3 parts of the solution (A-3) obtained in Synthesis Example 3. The resultant varnish was stored at 60° C. for one week. However, the varnish was not gelatinized.

The epoxy equivalent of the epoxy resin used in the present example was 0.345 equivalent, and the active hydrogen equivalent of the polyimide used therein was 0.368 equivalent.

As is evident from the above-mentioned results, the thermosetting resin composition of the invention has excellent storage stability, and further gives a cured product excellent in flame retardancy and heat resistance. Furthermore, it is clear that the film made of the composition has sufficient flexibility and folding endurance.

The invention claimed is:

1. A thermosetting resin composition, which comprises a polyimide resin (A) having a phenolic hydroxyl group and an epoxy resin (B), wherein the content proportion of the polyimide resin (A) is such a proportion that the equivalent of active hydrogen in the polyimide resin (A) is from 0.7 to 1.2 equivalents per equivalent of epoxy groups in the epoxy resin (B).

2. The thermosetting resin composition according to claim 1, wherein the polyimide resin (A) having a phenolic hydroxyl group is produced from a diamine component having a phenolic hydroxyl group, hereinafter referred to as an aminophenol, a diamine component having no phenolic hydroxyl group, hereinafter referred to as a diamino compound (b), and a tetrabasic acid dianhydride (c).

3. The thermosetting resin composition according to claim 2, wherein the aminophenol (a) is one or more selected from the group consisting of 3,3'-diamino-4,4'-dihydroxydiphenylsulfone, 3,3'-diamino-4,4'-dihydroxydiphenyl ether, 3,3'-diamino-4,4'-dihydroxybiphenyl, 3,3'-dihydroxy-4,4'-diaminobiphenyl, 2,2-bis(3-amino-4-hydroxyphenyl)propane, 1,3-hexafluoro-2,2-bis(3-amino-4-hydroxyphenyl)propane, and 9,9'-bis(3-amino-4-hydroxyphenyl)fluorene.

4. The thermosetting resin composition according to claim 1, wherein the polyamide resin (A) is a resin having, in the skeleton thereof, a sulfonyl group.

5. The thermosetting resin composition according to claim 1, wherein the epoxy resin (B) is one or more selected from the group consisting of novolac type epoxy resin, xylylene-skeleton-containing phenol novolac type epoxy resin, biphenyl-skeleton-containing novolac type epoxy resin, bisphenol A type epoxy resin, bisphenol F type epoxy resin, tetramethylbiphenol type epoxy resin, triphenylmethane type epoxy resin, and glyoxal type epoxy resin.

6. The thermosetting resin composition according to any one of claims 1 to 5, which comprises a curing promoting agent.

7. The thermosetting resin composition according to claim 3, wherein the epoxy resin (B) is comprised in an amount of 30 to 100 parts by weight for 100 parts by weight of the polyimide resin (A).

8. A varnish which comprises the thermosetting resin composition according to claim 1, and a solvent.

9. A prepreg which is obtained by impregnating a substrate with the varnish according to claim 8, and drying the resultant.

10. A sheet which has a layer comprising the composition according to claim 1 on both surfaces or one surface of a planar support.

11. The sheet according to claim 10, wherein the planar support is a polyimide film, a metal foil or a peeling film.

12. A cured product wherein the thermosetting resin composition according to claim 1 is cured.

13. The thermosetting resin composition according to claim 1, wherein the polyimide resin (A) having a phenolic hydroxyl group is a resin obtained by polycondensing 3,3',4,4'-diphenylsulfonetetracarboxylic acid dianhydride with 3,3'-diamino-4,4'-dihydroxyidiphenyl ether and 4,4'-diaminodiphenyl ether, or by polycondensing 3,3',4,4'-biphenyltetracarboxylic acid dianhydride with 3,3'-diamino-4,4'-dihydroxydiphenysulfone and isophoronediamine.

14. A thermosetting resin composition which comprises a polyimide resin (A) having a phenolic hydroxyl group and an epoxy resin (B), wherein the polyimide resin (A) having a phenolic hydroxyl group is produced from an aminophenol (a), a diamino compound (b) and a tetrabasic acid dianhydride (c), and the diamino compound (b) is one or more selected from m-phenylenediamine, p-phenylenediamine, m-tolylenediamine, 4,4-diaminodiphenyl ether, 3,3'-dimethyl-4,4'-diaminodiphenyl ether, 3,4'-diaminodiphenyl ether, 4,4'-diaminodiphenyl thioether, 3,3'-dimethyl-4,4'-diaminodiphenyl thioether, 3,3'-diethoxy-4,4'-diaminodiphenyl thioether, 3,3'-diaminodiphenyl thioether, 4,4'-diaminobenzophenone, 3,3'-dimethyl-4,4'-diaminobenzophenone, 3,3'-diaminodiphenylmethane, 4,4'-diaminodiphenylmethane, 3,4'-diaminodiphenylmethane, 3,3'-dimethoxy-4,4'-diaminodiphenyl thioether, 2,2'-bis(3-aminophenyl)propane, 2,2'-bis(4-aminophenyl)propane, 4,4'-diaminodiphenylsulfoxide, 3,3'-diaminodiphenylsulfone, 4,4'-diaminodiphenylsulfone, benzidine, 3,3'-dimethylbenzidine, 3,3'-dimethoxybenzidine, 3,3'-diaminobiphenyl, p-xylylenediamine, m-xylylenediamine, o-xylylenediamine, 2,2'-bis(3-aminophenoxyphenyl)propane, 2,2'-bis(4-aminophenoxylphenyl)propane, 1,3'-bis(4-aminophenoxyphenyl)benzene, 1,3'-bis(3-aminophenoxyphenyl)propane, bis(4-amino-3-methylphenyl)methane, bis(4-amino-3,5-dimethylphenyl)methane, bis(4-amino-3-ethylphenyl)methane, bis(4-amino-3,5-diethylphenyl)methane, bis(4-amino-3-propylphenyl)methane, bis(4-amino-3,5-dipropylphenyl)methane, siliconediamine, isophoronediamine, hexamethylenediamine, or trimethylhexamethylenediamine.

15. A thermosetting resin composition which comprises a polyimide resin (A) having a phenolic hydroxyl group and an epoxy resin (B), wherein the polyimide resin (A) having a phenolic hydroxyl group is produced from an aminophenol (a), a diamino compound (b) and a tetrabasic acid dianhydride (c), the aminophenol (a) is a diaminodihydroxydiphenyl compound wherein two phenyl groups each substituted with both of an amino group and a hydroxyl group are bonded to each other through —SO$_2$—, —O—, or —(CH$_3$ which may be substituted with fluorine) C(CH$_3$ which may be substituted with fluorine)-, and the diamino compound is a diaminodiphenyl compound wherein two amino-substituted phenyl groups in which each of the benzene rings may be substituted with a C1C4 alkyl group or a C1C4 alkoxy group are bonded directly to each other, or bonded to each other through a crosslinking group.

16. The thermosetting resin composition according to claim 15, wherein the crosslinking group of the diamino compound is —O—, —O—C$_6$H$_4$—O—, —SO$_2$—, or a C1C10alkylene which may be branched.

17. The thermosetting resin composition according to claim 15, wherein the diamino compound is at least one selected from the group consisting of 4,4'diaminodiphenyl ether, 1,3-bis(3-aminophenoxy)benzene, and isophoronediamine.

* * * * *